Oct. 23, 1923.
R. P. GRIEVE
1,471,955
VALVE FOR INTERNAL COMBUSTION ENGINES
Filed Sept. 27, 1921
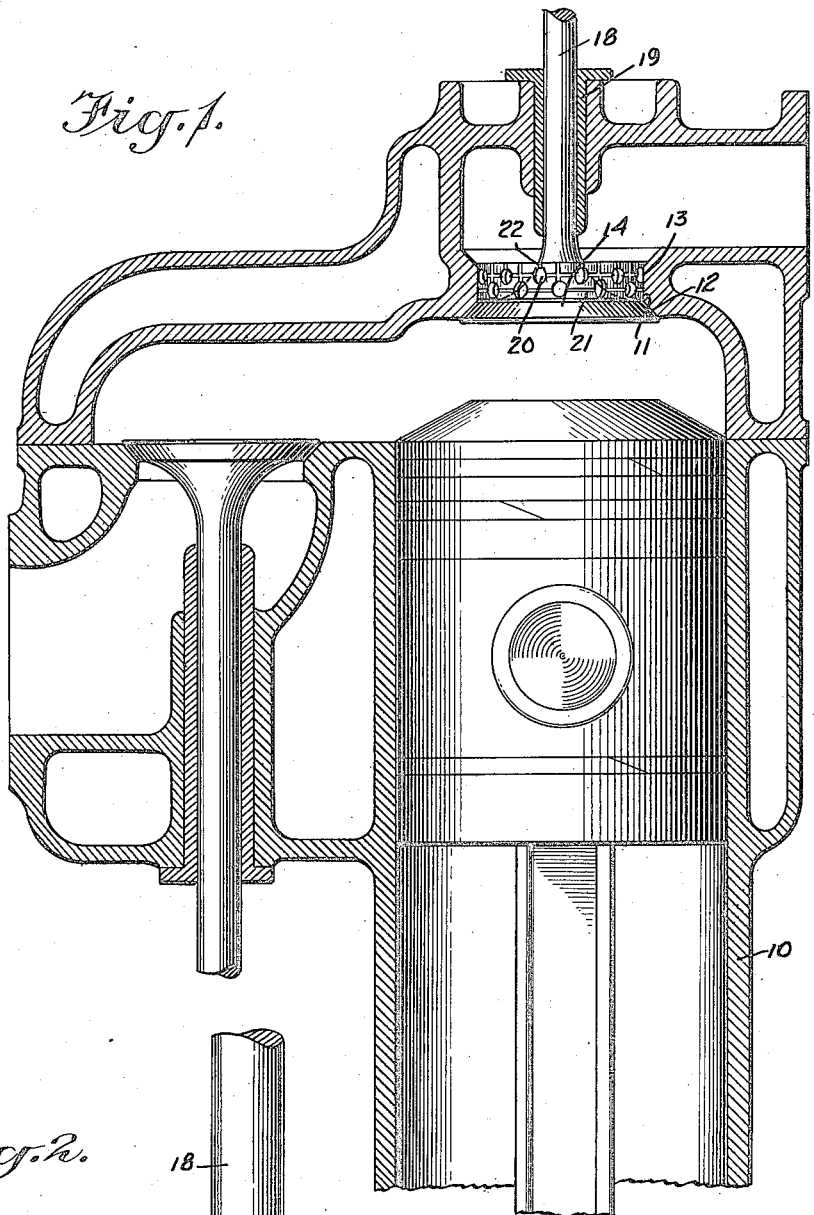
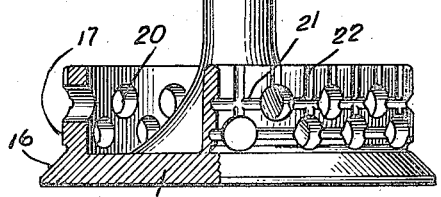
WITNESSES
INVENTOR
RICHARD P. GRIEVE
BY
ATTORNEYS Patented Oct. 23, 1923.

1,471,955

UNITED STATES PATENT OFFICE.

RICHARD PALMER GRIEVE, OF DETROIT, MICHIGAN.

VALVE FOR INTERNAL-COMBUSTION ENGINES.

Application filed September 27, 1921. Serial No. 503,633.

*To all whom it may concern:*

Be it known that I, RICHARD PALMER GRIEVE, a citizen of the United States, and a resident of Detroit, in the county of Wayne and State of Michigan, have invented new and useful Improvements in Valves for Internal-Combustion Engines, of which the following is a full, clear, and exact description.

This invention relates to improvements in valves for internal combustion engines.

The object of this invention is to provide a valve that assists in the breaking up of the particles of fuel as they enter the cylinders of the engine to reduce the mixture to the proper state for complete combustion and to distribute the mixture evenly to all parts of the combustion chamber.

Another object of this invention is the provision of a valve seat construction that can be kept cool at the rim and which serves to preheat the incoming mixture as it enters the cylinder.

A further object is the construction of a valve which has such a large number of openings that it does not retard the ingress of the fuel to the engine cylinder.

These objects are accomplished by providing in conjunction with the valve seat a cylindrical bearing surface in which a collar, integral with the valve head and having a plurality of connected openings therein, slides.

These and other objects of the invention will be more clearly understood from the following detailed description and accompanying drawings.

Figure 1 is a plan view of an engine cylinder with the valve placed in position; and Figure 2 is a side elevation of the inlet valve with a portion of the collar broken away.

Referring to the above-mentioned drawings, an engine cylinder 10 is provided with an inlet opening 11. This inlet opening 11 has a beveled valve seat 12 cut on its inner edge. Extending outward from the upper edge of the valve seat 12 is a cylindrical bearing surface 13. Mounted to control the opening 11 into the cylinder 10 is a valve 14.

The valve 14 consists of a valve head 15 having a beveled face 16 which is shaped to fit the beveled seat 12. Integral with the valve head 15 and extending upward is an annular collar 17. This collar makes slidable engagement with the cylindrical bearing surface 13. A valve stem 18 which is integral with the valve head 15 serves for operating the valve 14. This valve stem extends through the cap of the cylinder and has a packing gland 19 surrounding it. The annular collar 17 has a plurality of perforations 20 extending through it. These perforations may be made of a variety of shapes, such as cylindrical, the shape of conic frustum, etc. The perforations are joined together by means of circumferential and longitudinal grooves 21 and 22, respectively cut in the surface of the collar. The longitudinal grooves 22 extend to the upper edge of the collar 17 thus connecting the outer side of the perforations with the inlet pipe, thus preventing the collar from functioning as a piston valve. It might also be stated here that the grooves tend to equalize the flow of the mixture around the circumference of the collar in each cylinder regardless of the adjustment of the several valves. Incidentally the grooves will retain a bit of the fluid which will both lubricate and keep the collar clean.

The operation of the valve is as follows: When a charge of fuel is to be drawn into the cylinder the valve 14 is moved downward, the collar 17 sliding in the cylindrical bearing surface 13. The valve head 15 is removed from the seat 12 and the perforations move beyond the lower edge of the bearing surface 13. This allows fuel to pass through the perforations and into the cylinder. The fuel passing through the perforations 20 and the grooves 21 and 22 is broken up into very fine particles and passes into the cylinder in a very finely divided state. As it is drawn in through the grooves and perforations it is given a whirling motion that distributes it throughout the cylinder and the heavier particles do not settle on the walls and ignite, forming carbon. The large contact surface given to the valve through the construction of the cylindrical bearing surface 13 gives the valve greater capacity for keeping cool.

If the perforations in the collar are made the shape of conic frustums it adds to the turbulence of the fuel as it enters the cylinders. This collar also adds to the strength of the valve head and prevents any possibility of the latter buckling from excessive heat.

I would state in conclusion that while the illustrated example constitutes a practical embodiment of my invention I do not limit myself strictly to the exact details herein illustrated since manifestly the same can be considerably varied without departing from the spirit of the invention as defined in the appended claims.

Claims.

1. A valve for an internal combustion engine comprising a valve seat, a valve head shaped to fit the valve seat, a collar having a plurality of perforations therein integral with the valve head, and grooves cut in the collar connecting the perforations.

2. A valve for an internal combustion engine comprising a bevelled valve seat, a conical valve head shaped to fit the valve seat, an annular collar integral with the valve head, a plurality of perforations in the collar, and grooves in the collar connecting the perforations, and the perforations with the upper edge of the collar.

3. An intake valve for internal combustion engines comprising a bevelled valve seat, a valve stem, a valve head shaped to fit the valve seat mounted on said valve stem, a perforated annular collar having grooves therein connecting the perforations, and the perforations with the upper edge of the collar, integral with the valve head, said collar serving to break up the larger particles of fuel and to keep the valve at a satisfactory temperature.

4. An intake valve of the class described comprising a bevelled valve seat, a cylindrical bearing surface extending outward from the base of the valve seat, a valve stem having integral therewith a valve head shaped to fit the valve seat, a perforated annular collar integral with the valve head and slidable in the said cylindrical bearing surface, and grooves joining said perforations with one another and with the upper edge of the collar.

5. An intake valve of the character described comprising a valve seat, a valve head shaped to fit the valve seat, a collar having a plurality of perforations therein formed with the valve head, a series of grooves circumferentially formed on the collar connecting the perforations therein, and a series of longitudinal grooves formed on the collar connecting the perforations therein.

RICHARD PALMER GRIEVE.